United States Patent [19]

Veglia

[11] Patent Number: 4,648,475

[45] Date of Patent: Mar. 10, 1987

[54] TRANSMISSION UNIT FOR A VEHICLE WITH A TRANSVERSE ENGINE AND HALF-SHAFTS OF EQUAL LENGTH, HAVING AN INTERMEDIATE SHAFT PROVIDED WITH A RESILIENT SUPPORT

[75] Inventor: Bartolomeo Veglia, Turin, Italy

[73] Assignee: RIV-SKF Officine di Villar Perosa S.p.A., Turin, Italy

[21] Appl. No.: 590,076

[22] Filed: Mar. 15, 1984

[30] Foreign Application Priority Data

Mar. 17, 1983 [IT] Italy ............................... 53070/83[U]

[51] Int. Cl.[4] .............................................. B60K 5/04
[52] U.S. Cl. .................................... 180/297; 180/73.3
[58] Field of Search .................... 180/73.1, 73.2, 73.4, 180/73.3, 297; 74/701

[56] References Cited

U.S. PATENT DOCUMENTS 3,254,902  6/1966  Vittone .............................. 180/73.3
4,403,676  9/1983  Fujii et al. ........................... 180/297

Primary Examiner—Henry Bennett
Attorney, Agent, or Firm—Frost & Jacobs

[57] ABSTRACT

A transmission unit for a vehicle with a transverse engine and gearbox, beneath the gearbox there being carried a differential to which are connected half-shafts of equal length; a first half-shaft is connected to the differential by means of an intermediate shaft supported by a fixed support beneath the motor provided with a rolling element bearing housed in a casing, constituted by at least one sheet of pressed steel, and a resilient sleeve which connects together the outer ring of the bearing and the casing, having been directly adhered in a vulcanization phase onto both these.

3 Claims, 5 Drawing Figures

TRANSMISSION UNIT FOR A VEHICLE WITH A TRANSVERSE ENGINE AND HALF-SHAFTS OF EQUAL LENGTH, HAVING AN INTERMEDIATE SHAFT PROVIDED WITH A RESILIENT SUPPORT

BACKGROUND OF THE INVENTION

The present invention relates to a transmission unit for a vehicle with a transverse engine and gearbox mounted alongside the engine, in which the half-shafts transmit drive to the driving wheels of the vehicle. The half shafts have the same length, with one of the said half-shafts receiving drive from the differential through an intermediate shaft provided with a fixed support beneath the engine.

It is known that on modern front wheel drive vehicles with a transverse engine and gearbox, the differential is supported directly on the casing of the bearbox in a lateral position with respect to the central longitudinal plane of the vehicle. Therefore, some types of motor vehicle have half-shafts which transmit driving force from the differential to the driving wheels of the vehicle that are of different lengths. This asymmetry of the final elements of the transmission unit can produce disadvantages in running and vibrations, and may reduce the road holding ability of the vehicle due to the different elastodynamic characteristics of the two half-shafts of different lengths. To overcome this disadvantage, which is entirely negligible on motor vehicles of small capacity (about 1000 cc) but which can create very considerable problems on vehicles of high capacity and/or sporting vehicles, there are known transmission units in which the differential is provided on the side facing the mid line of the vehicle with an intermediate transmission shaft which extends to the opposite side of the vehicle where it is supported by means of a rigid support. In this way, the vehicle can be provided with half-shafts of identical length, one of which will be connected to the differential whilst the other is connected to the free end of the intermediate shaft. Transmission units of this second type are, however, of relatively high cost, due for the most part to the rigid support which must be formed and mounted with very great care in such a way as to avoid dangerous misalignments between the axis of the support and that of the intermediate shaft. Any misalignment would cause vibrations and an accelerated fatigue of the bearings which support the intermediate shaft. Finally, the thermal expansion and elastic deformation of the power unit during running can cause supplementary constraint or force loads. For this reason the assembly of such a transmission unit is also relatively time consuming and difficult.

SUMMARY OF THE INVENTION

The object of the present invention is that of providing a transmission unit for a vehicle provided with a transverse engine, of the type described above having an intermediate shaft, but which will be free of all the disadvantages first mentioned. In particular, the transmission of the present invention will be of economic construction and easy and rapid assembly.

This object is achieved by the present invention in that it relates to a transmission unit for a vehicle provided with a transverse engine. The transmission unit includes a gearbox mounted alongside the engine, a differential supported beneath the gearbox and provided with two associated half-shafts having the same length and connectable to the wheels of the vehicle by means of respective ball joints. The transmission unit also includes an intermediate shaft operable to connect a first half-shaft with the differential. Provided near the first half-shaft is a support which can be fixed beneath the engine, characterised by the fact that the support includes a rolling element bearing which is provided with an inner ring keyed to the intermediate shaft, an outer ring, and a plurality of rolling elements interposed between the inner and outer rings. A casing which can house the bearing and be fixed to the engine is constituted by at least one layer of pressed steel. A resiliently deformable intermediate elastomeric sleeve is positioned between the outer ring and the casing. The elastomeric sleeve is operable to allow misalignments of the intermediate shaft with respect to the axis of the casing without overloading the bearings and to damp possible vibrations transmitted between the engine and the intermediate shaft.

BRIEF DESCRIPTION OF THE DRAWINGS

For a better understanding of the present invention there will now be given a non-limitative description of several embodiments, with reference to the attached drawings, in which.

DETAILED DESCRIPTION OF THE INVENTION

Figure 1:
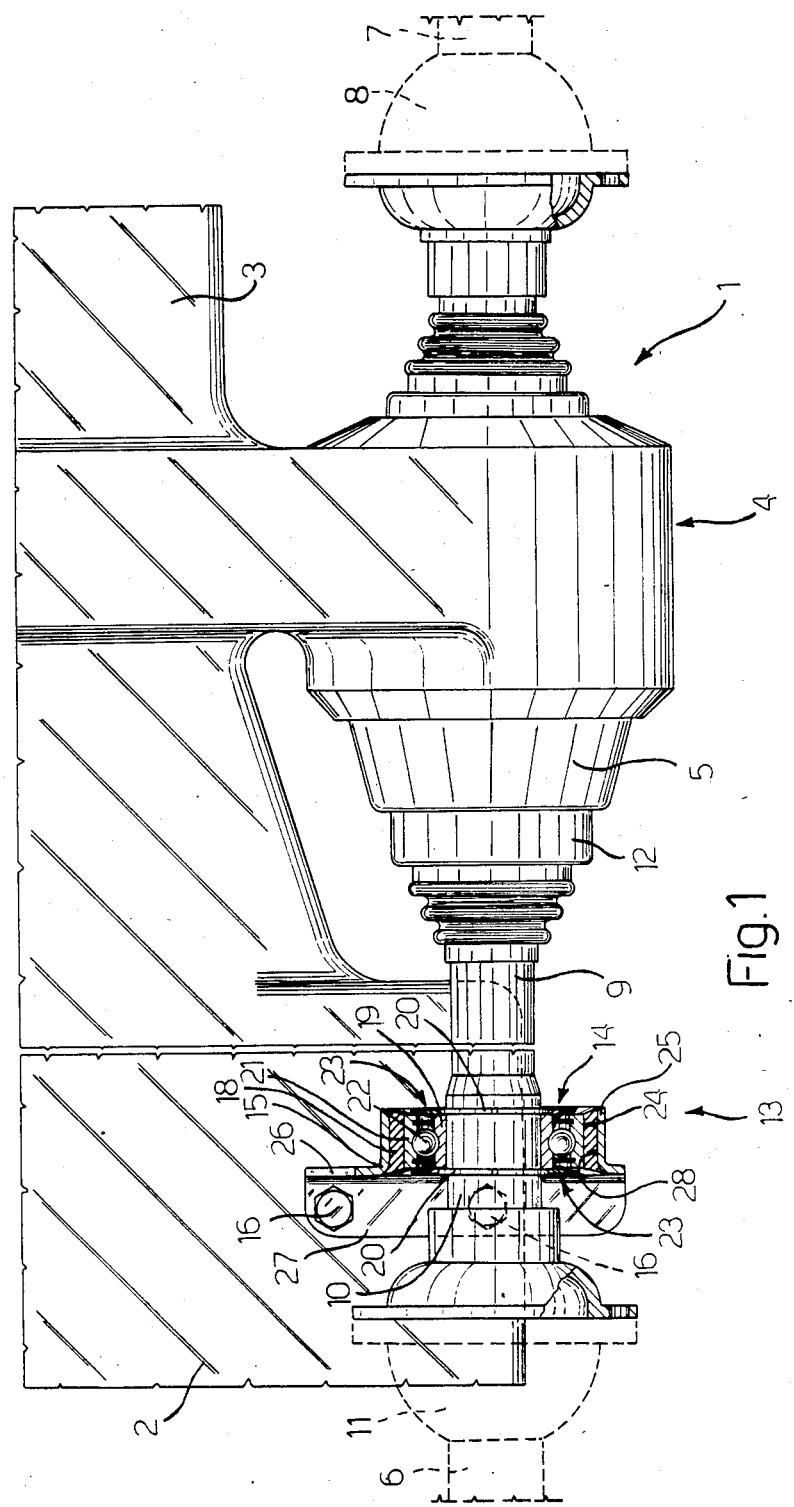
FIG. 1 schematically illustrates a transmission unit for a vehicle, not illustrated, formed according to the principles of the present invention.

With reference to FIG. 1, the reference numeral 1 generally indicates a transmission unit for a vehicle provided with a transversely mounted engine 2 and a gearbox 3. The gearbox 3 is located laterally displaced with respect to the longitudinal mid-plane of the vehicle; an arrangement of this type is known and is particularly employed in the case of front wheel drive vehicles. The gearbox 3 supports beneath it a differential 4 in a casing 5 which is rigidly connected to the casing of the gearbox 3. The casing 5 is also connected to two associated half-shafts 6 and 7 having the same length and which are connectable by means of respective (homokinetic) ball joints of a known type not illustrated, to respective drive wheels, not illustrated, of the vehicle. The half-shaft 7 is directly connected to the differential 4 by means of a suitable ball joint 8. The half-shaft 6, which is located on the opposite side with respect to the gearbox 3 and the differential 4, is connected to the latter by means of a rectilinear intermediate transmission shaft 9 disposed beneath and parallel to the engine 2. The intermediate shaft 9 is provided at one of its ends 10 with a ball joint 11 identical to the joint 8, by means of which it is connected to the half-shaft 6.

The intermediate shaft 9 projects directly from one end 12 of the differential 4 facing oppositely from the half-shaft 7. The intermediate shaft 9 is provided with suitable bearings, not illustrated for simplicity, to support the shaft 9. Shaft is further supported at its end 10, near the half shaft 6, by a support 13 rigidly connected beneath the engine 2.

According to the invention, the support 13 includes a rolling element bearing 14 of any known type, a casing 15 substantially in the form of a sleeve and operable to house the bearing 14 and to be fixed to the engine 2 with any suitable means, for example by means of screws 16. The support 13 also includes a resiliently deformable substantially cylindrical intermediate sleeve 18, made of an elastomeric material, interposed between the bearing 14 and the casing 15 and also housed within the latter. The bearing 14 includes an inner ring 19 keyed for rotation with a shaft 9 and axially locked thereon, for example, by means of respective spaced apart resilient rings 20. An outer ring 21 is coaxial with ring 19. A plurality of rolling elements 22 (in the illustrated example the rolling elements 22 are balls) interposed are between the rings 19 and 21. The opposite ends of the bearing 14 are provided with respective sealing assemblies 23 of a known type, for example, of the twin screen and axial and radial sealing labyrinth type, with a centrifuging disc. The outer ring 21 is externally delimited by a lateral outer cylindrical surface 24 and is mounted within a sleeve portion 25 of the casing 15. The casing 15 is constituted by a single sheet of cut and pressed substantially flat sheet steel 26. One face of the sleeve portion 25 has been formed by plastic deformation, and the opposite face has been formed with a projecting attachment flange 27 bent over at 90° with respect to the plane in which the sheet 26 lies. The flange 27 is provided with suitable holes which can be engaged by screws 16 to fix the casing 15 to the engine 2.

The sleeve 18 constitutes the element which connects the bearing 14 both axially and angularly to the casing 15 in that it is rigidly and intimately connected to the cylindrical surface 24 of the outer ring 21 and to a corresponding lateral internal cylindrical surface 28 of the sleeve portion 25 coaxial to and facing the surface 24. In particular, the sleeve 18 is directly secured by vulcanization, to both the surfaces 24 and 28, and forms an integral part both of the ring 21 and of the casing 15. The ring 21 and casing 15 constitute, together with the sleeve 18, a single element or unit. The sleeve 18 must be sufficiently resilient to allow slight misalignments of the ring 21 with respect to the axis of the casing 15 (in particular with respect to the axis of the sleeve portion 23), without causing overloading of the bearing 14. Likewise, the sleeve 18 must be able to damp vibrations transmitted between the engine 2 and the intermediate shaft. The sleeve 18 must further be able to support onerous thermal and chemical conditions in use, in that because of the position of the support 13, it is exposed to heat from the engine 2 and to attack from both liquid and gaseous hydrocarbon substances. After numerous experimental tests, it has surprisingly been found that the sleeves 18 made with elastomeric resin formed with mixtures based on polychloroprene had all the required characteristics.

Figure 2:
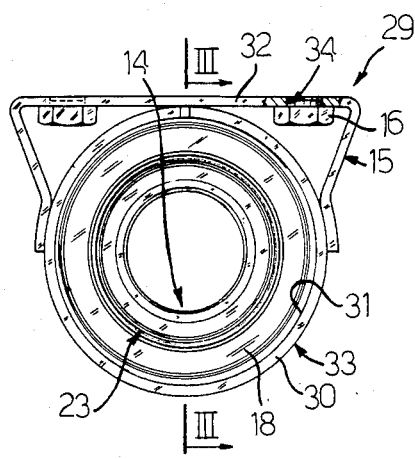
FIGS. 2 and 3 illustrate two views, of which one (FIG. 3) is on an enlarged scale, variant of a detail of the transmission of FIG. 1.
Figure 3:
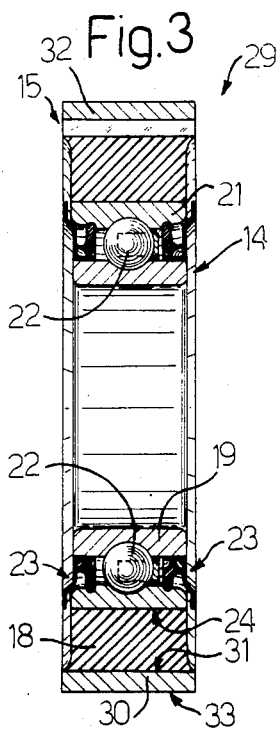

With reference to FIGS. 2 and 3, these show a variant 29 of the support 13 of FIG. 1, which can be mounted on the transmission unit 1. The same or similar components and details as those already described are indicated with the same reference numerals. In particular, the support 29 differs from the support 13 only as far as the casing 15 is concerned, while the bearing 14 is entirely identical to that of the support 13 of FIG. 1 which has already been described. It is in any case obvious that the bearing 14 could be replaced by any other known type of rolling element bearing, having single and/or double rings of rolling elements, provided that it has an outer ring, directly, rigidly and intimately fixed to the elastomeric sleeve 18 by means of casting in a vulcanisation phase directly onto the outer surface 24 of the outer ring. The casing 15 of the support 29 is composed of a substantially cylindrical sheet steel sleeve 30, delimited internally by a cylindrical inner lateral surface 31, which is directly and intimately fixed to the elastomeric element 18, and by a substantially C-shape pressed and folded sheet metal element 32 welded, for example, to the sleeve on an outer cylindrical surface 33. The element 32 is also provided with holes 34 which can carry nuts 16 to fix the casing 15 to the engine 2 by means of suitable screws.

Figure 4:
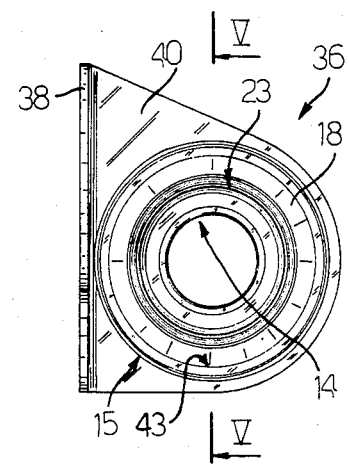
FIGS. 4 and 5 illustrate two views, of which one (FIG. 5) is on an enlarged scale, of a second variant of the same detail of the transmission of FIG. 1.
Figure 5:
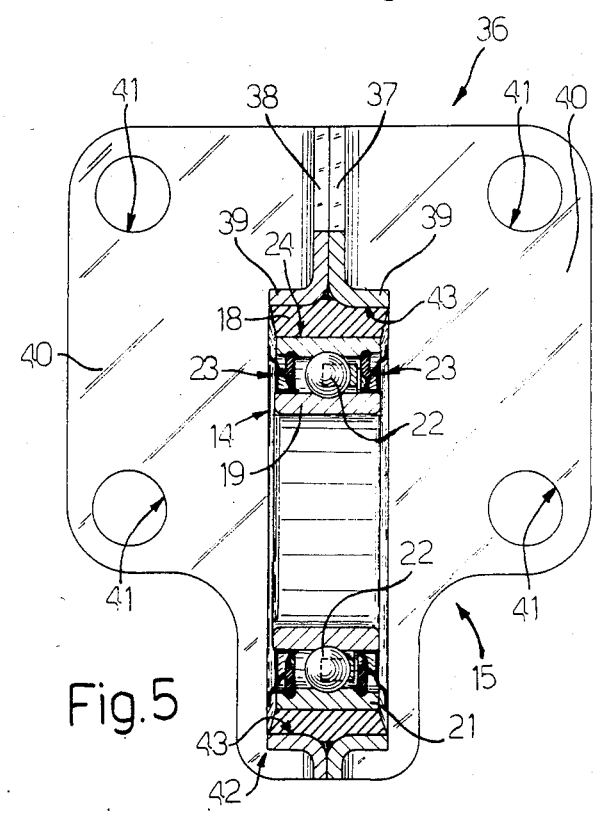

In FIGS. 4 and 5, there is illustrated a second variant 36 of the support 13 of FIG. 1 which can be mounted on the transmission unit 1. The components details are the same or similar to those already described and indicated with the same reference numerals. The support 36 differs from the support 13 of FIG. 1 only in the form and construction of the casing 19, while the bearing 14 is entirely identical to that of FIG. 1. The bearing 14 could be replaced by any other known type of rolling element bearing having one or more rings of rolling elements of any form. The casing 15 of the support 36 is composed of two completely symmetrical mirror image elements 37 and 38. Each element is constituted by a single substantially flat sheet of metal pressed and cut in such a way as to obtain a substantially cylindrical sleeve portion 39 projecting therefrom, and an attachment portion 40. The flange 40 is folded at 90° with respect to the plane in which elements 37 and 38 lie and face, in this case, in the same direction as the sleeve portion 39. The flanges 40 are provided with respective holes 41 which can be engaged by screws 16, and the elements 37 and 38 are mounted alongside and face one another and are fixed together, for example, by means of welding. The two sleeve portions 39 of the elements 38 and 37 constitute a single sleeve 42 which can house the bearing 14 and the elastomeric element 18, and have respective cylindrical lateral inner surfaces 43 which are directly and intimately fixed to the elastomeric sleeve 18.

From what has been described, the advantages of the present invention will be apparent. It allows a transmission unit for vehicles provided with a transverse engine and gearbox to be formed in such a way that the half-shafts have the same length, and in which the intermediate shaft which connects one of the half-shafts with the differential is supported by means of a single unit of low cost. The unit is quick and easy to assemble and does not require a perfect coaxial location between the intermediate shaft and the axis of the support itself. Thus, the disadvantages of transmission units in which the half-shafts have different lengths are avoided and at the same time the disadvantages of difficult assembly, irregular operation and high cost of transmission units provided with an intermediate shaft is also avoided. Further, this solution also obtains the advantage of damping the vibrations (thus improving the quiet running) which can be transmitted between the engine and the intermediate shaft and of significantly reducing the weight of the support for the latter. Finally, the costs and the production operations for the construction of the support according to the invention are drastically reduced with respect to those necessary for the construction of known rigid supports, which are formed from a single casting of aluminum or light alloy. The adoption of elastomeric sleeves in polychloroprene finally solves, in a satisfactory manner, all the problems which the adoption of sleeves of normal rubber could involve.

Finally, from what has been described, it is clear that variations and modifications to the present invention can be introduced without departing from the scope of the invention itself.

I claim:

1. A transmission unit for a vehicle provided with a transverse engine, said unit including a gear box mounted along side said engine, a differential supported beneath said gear box and connected to first and second half-shafts having the same length and connectable to the wheels of the vehicle by means of respective ball joints, an intermediate shaft connected to said first half-shaft and to said differential, and a support provided near said first half-shaft which can be fixed beneath said engine, said support comprising a rolling element bearing which is provided with an inner ring fixed to said intermediate shaft, an outer ring, and a plurality of rolling elements interposed between the inner ring and the outer ring, a casing housing said bearing and adapted to be fixed to said engine, said casing being formed of at least one layer of pressed sheet metal, and a resiliently deformable elastomeric intermediate sleeve connecting said casing and said outer ring, said elastomeric sleeve being vulcanized to said casing and said outer ring to form an integral unit, said elastomeric sleeve compensating for misalignment of the intermediate shaft with respect to the axis of said casing without overloading said bearing, and acting to damp vibrations transmitted between said engine and said intermediate shaft.

2. A transmission unit according to claim 1, wherein said elastomeric sleeve is made from a mixture based on polychloroprene.

3. A transmission unit according to claim 1, wherein said casing includes two elements made from pressed sheet metal and welded together.

* * * * *